United States Patent [19]

Singh

[11] 4,098,092
[45] Jul. 4, 1978

[54] HEATING SYSTEM WITH WATER HEATER RECOVERY

[76] Inventor: Kanwal N. Singh, 6436 Saddle Lane Ct., Westerville, Ohio 43081

[21] Appl. No.: 749,170

[22] Filed: Dec. 9, 1976

[51] Int. Cl.² ..................... F25B 27/02; F25B 13/00
[52] U.S. Cl. ..................................... 62/238; 62/324
[58] Field of Search ............................. 62/238, 324

[56] References Cited

U.S. PATENT DOCUMENTS

| | | | |
|---|---|---|---|
| 2,751,761 | 6/1956 | Borgerd | 62/238 |
| 3,188,829 | 6/1965 | Siewert et al. | 62/238 |
| 3,301,002 | 1/1967 | McGrath | 62/238 |
| 3,916,638 | 11/1975 | Schmidt | 62/238 |
| 3,922,876 | 12/1975 | Wetherington, Jr. | 62/238 |
| 3,984,050 | 10/1976 | Gustafsson | 62/238 |
| 3,989,183 | 11/1976 | Gustafsson | 62/238 |

*Primary Examiner*—Lloyd L. King
*Attorney, Agent, or Firm*—Mahoney & Stebens

[57] ABSTRACT

A heating system is provided for residential buildings in which heat is recovered by an auxiliary water heater. The heating system is of a heat pump type which includes a refrigerant fluid compressor and two heat exchanger units disposed in series connected relationship. The two heat exchanger units are those normally associated with respective fan and coil unit located within the interior of the residence and a condenser or evaporator located exteriorally of the building. A control valve is interposed in conduits connecting the two heat exchanger units with the compressor with this valve being selectively operable to control the system for operation in either a heating or a cooling mode. In accordance with this invention, an auxiliary water heater is interposed in heat recovery relationship to the heating system and includes a heat exchanger that is interconnected in the refrigerant fluid conduit. The auxiliary water heater has a heat exchanger that is interconnected in the conduit intermediate the compressor and the control valve. This water heater is thus able to recover excess heat regardless of whether the heating system is operating in a heating or cooling mode.

3 Claims, 1 Drawing Figure

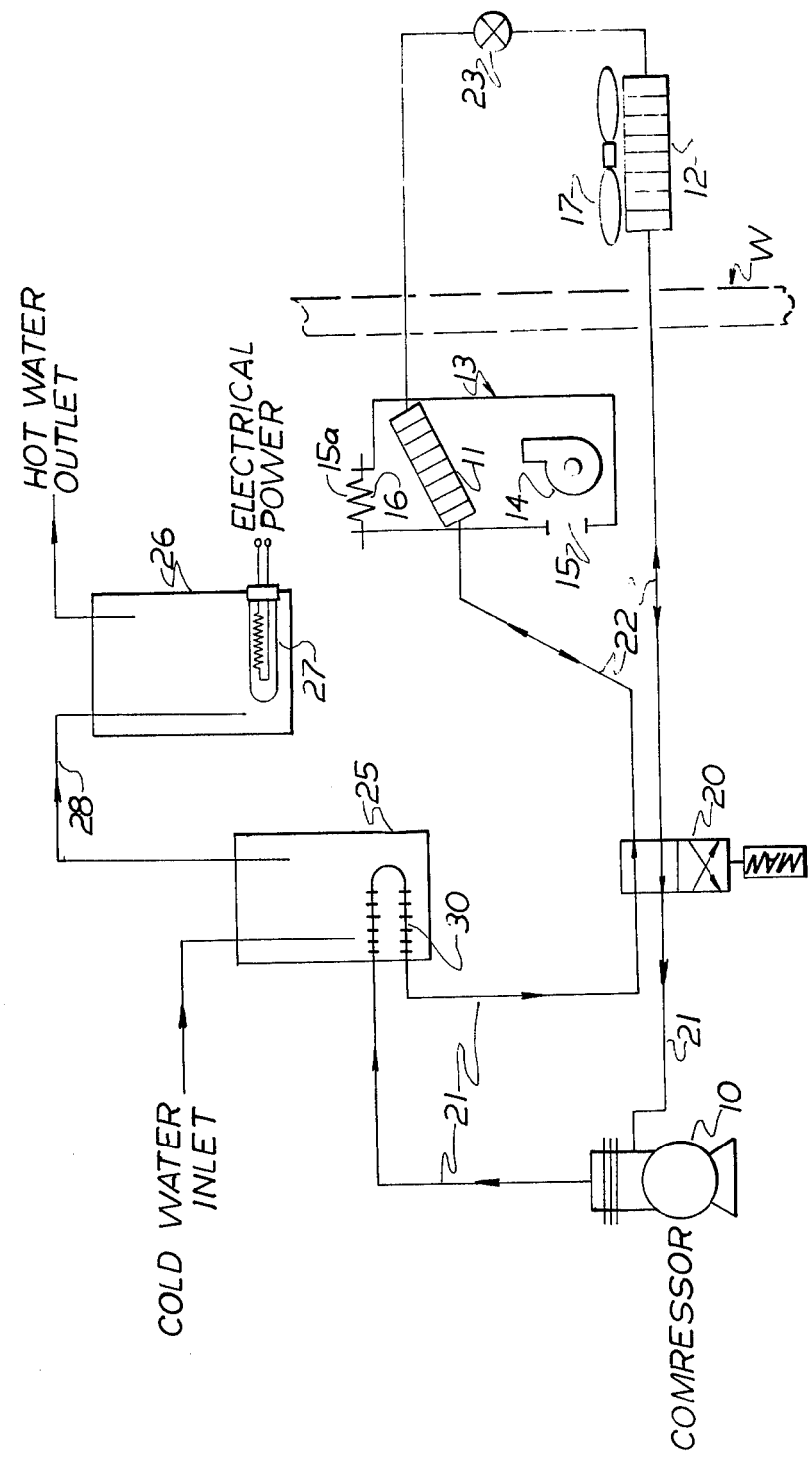

HEATING SYSTEM WITH WATER HEATER RECOVERY

BACKGROUND OF THE INVENTION

Many forms of heat pump-type residential heating systems have been devised. These systems normally include a refrigerant fluid compressor that is interconnected with two heat exchanger units. These two heat exchanger units are alternatively operated as evaporators or condensers depending upon the positioning of a directional control valve in the interconnecting refrigerant fluid conduit. The one heat exchanger unit is normally positioned within the interior of a residential building and is associated with heating or cooling apparatus, such as the well-known fan and coil type. The other heat exchanger unit is located exteriorily of the building and the heat pump is operated to either add heat to the interior of the residence or to remove heat and permit it to be merely dissipated at the exterior of the building.

While the heat pump system is inherently an efficient heating and cooling system for residences, there is nevertheless some loss of heat during the operation of such apparatus. Attempts have been made to improve the economy of the operation by utilizing excess heat that is developed within the system for other purposes. Primarily, this excess heat is attempted to be utilized in performance of auxiliary heating functions and specifically, in the heating of water that is also used within a residential household. An example of such a previously devised system is disclosed in U.S. Pat. No. 3,916,638, granted Nov. 4, 1975 to A. Carl Schmidt. The system disclosed in that patent includes a compressor, two heat exchanger units and a water heater also having a heat exchanger unit. The interconnection of the several units, however, is such that the heat exchanger of the water heater is only selectively interconnectable to the system in one mode of operation. Effectively, the water heater can only be functioning when the system is operated in the cooling mode. With the interconnection of the heat exchanger for the water heater as shown in that patent, the patented system will be ineffective in attempting to obtain sufficient heat with which to operate the water heater when the system is operated in a heating mode.

SUMMARY OF THE INVENTION

In accordance with this invention, a heating system is provided for a residential unit and which system includes a heat pump in combination with an auxiliary water heater, such that the water heater can be operated to derive heat that would otherwise be wasted in either a heating or cooling mode of operation. In the inventive system, the heat pump includes a compressor unit which is interconnected with two series connected heat exchanger units. The refrigerant fluid conduit interconnecting the compressor and heat exchanger units includes a selectively operable four-way valve for directing the refrigerant flow into conduits in either of two directions with respect to the heat exchanger units. One of the heat exchanger units is positioned in a heat converting system within the residence while the other heat exchanger is positioned exteriorily of the residence. Depending on the direction of refrigerant flow in the conduits with respect to the heat exchanger units, the system can operate in either a heating or cooling mode as to the residential building.

In accordance with this invention, to further enhance the efficiency of the system and effectively utilize heat that would otherwise be wasted in either the heating or cooling mode, an auxiliary water heater is provided which has its own heat exchanger unit. This heat exchange unit for the water heater is interconnected in the refrigerant fluid conduit system intermediate to the compressor and the fourway control valve. Accordingly, this water heater will obtain heat from the system regardless whether it is operating in either a heating or cooling mode.

Preferably, the illustrated system also includes a conventional water heater which may either be an electric or a gas fired unit, that receives water from the auxiliary water heater. Consequently, the conventional heater which is normally capable of effectively meeting the hot water requirements of the residence, will require a lesser degree of energy input as the water it receives will be at a substantially elevated temperature. This enhances the efficiency and lowers the cost of operation of the combined heating and water heating systems of the residence.

These, and other objects and advantages of this invention, will be readily apparent from the following detailed description of an embodiment thereof and the accompanying drawing.

DESCRIPTION OF THE DRAWING FIGURE

The single FIGURE of the drawing is a schematic diagram of the heating system of this invention.

DESCRIPTION OF THE ILLUSTRATIVE EMBODIMENT

Having reference to the drawing, there is illustrated therein a heating system for a residential type building. The relationship of the components of the building to the interior exterior thereof is indicated diagrammatically by the line designated as a wall W in the drawing. The components of the system appearing to the left of the wall are those that are positioned and contained within the residence while those appearing at the right of the designated wall line are those positioned exteriorily of the building.

The heating system includes the basic components of the compressor 10 and two heat exchanger units 11 and 12. The heat exchanger unit 11 is positioned in operative relationship to a heating unit indicated generally as 13. This heating unit 13 will be understood to also be capable of functioning in a cooling mode as the heat exchanger unit may function as either a condenser or evaporator with this type of system. Also included in the heating unit 13 is a fan 14 which is coupled with the air circulating system that has respective inlet and outlet connections 15 and 15a for interconnecting with the distribution system extending throughout the residence. The inlet and outlets are only diagrammatically illustrated with the outlet 15a also being provided with an auxiliary electrical resistance heating unit 16. This auxiliary electrical resistance heating unit 16 is normally installed to provide heat when the outside air temperature has dropped to a sufficiently low level that the heat pump is incapable of providing sufficient heat for the residence.

Positioned exteriorally of the residence is the second heat exchanger 12 which is also capable of functioning as either a condenser or as an evaporator. This unit is provided with its own air circulating fan 17 for inducing air flow through the coils of the unit.

A fluid conduit system is provided for circulation of the refrigerant fluid from the compressor 10 to the heat exchanger units 11 and 12. This fluid conduit includes a fourway fluid control valve 20. This valve 20 is indicated to be of the manually operated type and may be selectively positioned in either of two positions to obtain the directional flow indicated by the arrows. Coupled with one set of ports of this valve is a conduit 21 forming a loop connection through the compressor 10. Coupled with a second set of ports of the valve is a second conduit 22 forming a loop connection which connects the two heat exchanger units 11 and 12 in series relationship. Also interconnected in the conduit 22, intermediate the two heat exchanger units 11 and 12, is an expansion valve 23 which performs the usual function of such valves in refrigerant systems.

Although not specifically illustrated, it will be understood that the several components and the controls of the system are preferably of the electrically operated and controlled type. Specifically, the compressor 10 includes an electrical motor with the fan 14 also being driven by an electric motor. The air circulating fan 17 associated with the exterior heat exchanger unit 12, is also driven by an electric motor. An electrical control system of conventional and well known construction, and therefor not necessary to describe in any detail or to illustrate, would be interconnected with these units. That control system would also include a thermostatic device for effectively controlling the temperature within the interior of the residence to a predetermined temperature range. That system would be automatic in its operation and not require any extensive attention by the persons residing within the household. The four-way valve 20 is illustrated as being of a manual type and thus requires manual operation for placement in a desired position to switch betweeen a heating and cooling mode. It is readily apparent that additional control circuitry could be provided to initiate automatic operation of the four-way valve 20 by means of an electrical solenoid and appropriate temperature responsive elements.

In accordance with this invention, an auxiliary water heating unit 25 is provided to utilize and recover heat that is generated in the system that could very well otherwise be merely dissipated to the exterior of the residence in a cooling mode of operation and to also obtain the heat necessary for its operation in a heating mode. Generally the capacity of heat pump system is such that there is available heat that can be obtained from the exterior of the residence but that heat is not utilized in systems such as that illustrated in the Schmidt U.S. Pat. No. 3,916,638. However, in accordance with the system of this invention, such heat is designed to be utilized in elevating the temperature of the residence water system through the means of the auxiliary water heating unit 25. This unit is not designed to provide the total source of heated water for a residential household and is, therefore, connected in series with a conventional water heater which is designated generally by the numeral 26. This conventional water heater is illustrated to be of the electrically heated type and has an electric heating element 27 that would be connected to the residence's electrical system. The water system is connected to heating units 25 and 26 in such manner that the inlet of cold water is connected to the auxiliary water heater unit 25. An outlet of the water heating unit 25 is connected by a conduit 28 to the inlet of the conventional water heater 26. The outlet of this water heater 26 is then connected to the hot water system of the residence by the indicated conduit 29.

In order to enable the system to derive heat for pre-heating of the water in the auxiliary water heating unit 25, this unit is provided with a heat exchanger 30. Thie heat exchanger 30 comprises a refrigerant fluid conduit formed as a coil that is mounted within the interior of the tank of this heating unit 25 and thus immersed in the water contained therein. Better heat transfer efficiency may be obtained through the inclusion of radiating fins secured to this coil. An outlet conduit 21 from the compressor 10 from which the compressed refrigerant gas is obtained is connected to the inlet of the heat exchanger 30. The outlet of that exchanger is then connected to a port of the valve 20 from which the refrigerant gas is routed either first to the unit 11 in the air circulating chamber 15 or to the heat exchanger unit 12 located exteriorally of the residence. With this connection, the compressed refrigerant gas, which is at a substantially elevated temperature upon leaving the compressor, will enter the coil of the heat exchanger 30 and, through exchange of heat for elevating the temperature of the water within the heating unit 25, and reduce the temperature of the refrigerant gas. Accordingly, it will be seen that the heat exchanger 30 is effective in transferring heat for elevating the temperature of the water in the auxiliary water heating unit 25 regardless of the mode of operation of the heat pump system as determined by the positioning of the four-way valve 20.

Preferably, the auxiliary water heating unit 25 is designed and operated only as a pre-heater and thus raises the temperature of the water to a predetermined extent that is somewhat less than that of a normal hot water temperature in the household system. The remaining heat is added by the conventional water heater 26 as may be required by the specifics of any particular operating condition. For example, in a cooling mode of operation, a substantial amount of heat can be obtained through the heat pump system and transferred in the pre-heating of water in the auxiliary water heating unit 25. This will thus result in a relatively small heat input requirement from the conventional water heater 27. Similarly, when operated in a heating mode, and the outside air temperature is relatively high, there will be substantial amount of heat that can be obtained by the heat pump system and dissipated in pre-heating of the water in the auxiliary water heating unit 25. This will thus result in a relatively small heat input required from the conventional water 27. However, as the outside air temperature lowers, this available heat will also decrease and there will be then less heat available for pre-heating of the water. Consequently, the electrical power requirements of the heater 27 in the conventional water heater 26 will be proportionally increased to maintain the desired water temperature in the hot water system.

Operation of the heating system will be readily apparent by reference to the schematic diagram in view of the preceding description of the operation of the several components. In the drawing, the four-way valve 20 is shown positioned where the system will operate in a cooling mode. In that interconnection, the compressor 10 will discharge the compressed and heated refrigerant gas through the conduits 21 and 22 to first pass through the heat exchanger unit 11 located within the heating unit 13. Consequently, the heat exchanger unit 11 will function as a condenser thereby extracting heat from the air circulated by the fan 14 through the heat exchanger unit 11. The refrigerant fluid thus condensed to a liquid form passes through the expansion valve 23 and into the second heat exchanger unit 12. This heat exchanger unit is then operating as an evaporator with the fan 17 forcing air through the unit. The refrigerant is evaporated to a gaseous state where it is returned through conduits 22 and 21 to the compressor 10 for continuation of this cycle.

In the heating mode of operation, the valve 20 would be positioned to interconnect the conduits 22 so that refrigerant will go through this conduit in a reverse manner. In this heating mode, the compressed and heated refrigerant fluid in a gaseous state would pass through the valve 20 and first enter the heat exchanger unit 12 located exteriorally of the building. In this heating mode, that heat exchanger unit 12 is operating as a condenser and heat is thus extracted from the air outside of the residence as a consequence of the fan 17 forcing air through this unit. This gas is then condensed and flows as a liquid through the expansion valve 23 and subsequently expands up entering the heat exchanger unit 11 operating now as an evaporator and located within the heating unit 13.

It will be readily apparent from the foregoing detailed description of the illustrative embodiment of this invention, that a particularly efficient heating system is provided for also providing heat for a water heating system. This advantageous operation is obtained regardless of whether the heating system is operated in a heating or cooling mode through the novel interconnection of an auxiliary water heating unit and its associated heat exchanger unit at a point where it is uneffected by any reversal in direction of flow of the refrigerant fluid. The heat exchanger unit associated with the auxiliary water heater is always connected in the system to effect a transfer of heat to preheat the water and enhance the efficiency and continuity of operation of the system.

Having thus described this invention, what is claimed is:

1. A heating system for a building comprising
    a fluid refrigerant compressor
    a first heat exchanger incorporated in a building heating apparatus
    a second heat exchanger disposed external to a building to be thus heated
    fluid conduit means interconnecting said compressor and heat exchangers in series relationship and carrying a refrigerant fluid
    selectively operable valve means interposed in said fluid conduit means intermediate said compressor and said first and second heat exchangers
    to alternatively route refrigerant fluid flow through said heat exchangers in opposite directions, and
    water heating apparatus which includes an auxiliary unit and a primary unit, said auxiliary unit having a heat exchanger which is interconnected in said fluid conduit means intermediate said compressor and said valve means in downstream relationship to said compressor, said auxiliary unit having a water inlet connectable to a water source and an outlet communicating with said primary unit enabling water flow from the auxiliary unit water inlet and into said primary unit, said primary unit having a water outlet connectable with a utilization system and including an independent heat source responsively operable to the temperature of the water in said primary unit.

2. A heating system according to claim 1 wherein said valve means is a four-way reversing valve.

3. A heating system according to claim 2 wherein said compressor is connected to a first set of ports of said valve and first and second exchangers are series connected and are connected to a second set of ports of said valve and said fluid conduit means includes an expansion valve interconnected therein between said first and second heat exchangers.

* * * * *